United States Patent
Nakagawa

(10) Patent No.: US 8,930,757 B2
(45) Date of Patent: Jan. 6, 2015

(54) OPERATIONS MANAGEMENT APPARATUS, OPERATIONS MANAGEMENT METHOD AND PROGRAM

(75) Inventor: Kiyoshi Nakagawa, Tokyo (JP)

(73) Assignee: NEC Corporation, Tokyo (JP)

( * ) Notice: Subject to any disclaimer, the term of this patent is extended or adjusted under 35 U.S.C. 154(b) by 208 days.

(21) Appl. No.: 13/505,273

(22) PCT Filed: Dec. 13, 2011

(86) PCT No.: PCT/JP2011/079275
§ 371 (c)(1),
(2), (4) Date: Aug. 17, 2012

(87) PCT Pub. No.: WO2012/101933
PCT Pub. Date: Aug. 2, 2012

(65) Prior Publication Data
US 2013/0151907 A1    Jun. 13, 2013

(30) Foreign Application Priority Data
Jan. 24, 2011  (JP) ................................ 2011-011887

(51) Int. Cl.
G06F 11/00 (2006.01)

(52) U.S. Cl.
USPC .............................. 714/26; 714/47.1; 702/185

(58) Field of Classification Search
CPC ............ G06F 11/3072; G06F 11/3447; G06F 11/3452
USPC ..................... 714/26, 47.1; 702/185
See application file for complete search history.

(56) References Cited

U.S. PATENT DOCUMENTS

| | | | | |
|---|---|---|---|---|
| 7,280,988 | B2 * | 10/2007 | Helsper et al. | 706/26 |
| 7,337,090 | B1 * | 2/2008 | Yemini et al. | 702/183 |
| 7,617,313 | B1 * | 11/2009 | Washburn et al. | 709/224 |
| 7,827,447 | B2 * | 11/2010 | Eberbach et al. | 714/45 |
| 8,095,830 | B1 * | 1/2012 | Cohen et al. | 714/45 |
| 2005/0216793 | A1 * | 9/2005 | Entin et al. | 714/38 |
| 2007/0130097 | A1 * | 6/2007 | Andreev et al. | 706/46 |
| 2008/0004841 | A1 * | 1/2008 | Nakamura | 702/186 |
| 2008/0016412 | A1 * | 1/2008 | White et al. | 714/48 |
| 2008/0168308 | A1 * | 7/2008 | Eberbach et al. | 714/26 |
| 2008/0262822 | A1 * | 10/2008 | Hardwick et al. | 703/21 |
| 2009/0210745 | A1 * | 8/2009 | Becker et al. | 714/26 |
| 2009/0216624 | A1 * | 8/2009 | Kato | 705/10 |
| 2009/0217099 | A1 * | 8/2009 | Kato | 714/37 |

(Continued)

FOREIGN PATENT DOCUMENTS

| | | |
|---|---|---|
| JP | 6-131468 A | 5/1994 |
| JP | 2001-344259 A | 12/2001 |

(Continued)

*Primary Examiner* — Marc Duncan
(74) *Attorney, Agent, or Firm* — McGinn IP Law. Group, PLLC

(57) ABSTRACT

A correlation model is updated quickly in the case that monitored metrics are changed.
The correlation model storing unit 112 stores a first correlation model including a correlation detected for a pair of metrics in first plural metrics. The correlation model updating unit 103, in the case that a metric is added, judges existence of a correlation for each of pairs of metrics obtained by excluding the pair of metrics in first plural metrics from pairs of metrics in second plural metrics including the added metric and the first plural metrics, and generates a second correlation model by adding the detected correlation to the first correlation model.

21 Claims, 13 Drawing Sheets

(56) References Cited

U.S. PATENT DOCUMENTS

2010/0229187 A1* 9/2010 Marwah et al. .............. 719/318
2011/0185235 A1* 7/2011 Iizuka ......................... 714/47.3
2011/0225462 A1    9/2011 Kato
2012/0023041 A1* 1/2012 Kariv et al. .................. 706/12
2012/0304007 A1* 11/2012 Hanks et al. ................. 714/26
2013/0231978 A1* 9/2013 Curbera et al. .............. 705/7.36

FOREIGN PATENT DOCUMENTS

| | | |
|---|---|---|
| JP | 2009-199533 A | 9/2009 |
| JP | 2009-199534 A | 9/2009 |
| JP | 2010-237910 A | 10/2010 |

* cited by examiner

Fig.5

| TIME | SV1. CPU | SV1. DSK | SV2. CPU | SV2. MEM | SV3. CPU | SV3. MEM | SV3. DSK |
|---|---|---|---|---|---|---|---|
| 2011/1/7 10:00 | 15 | 79 | 50 | 32 | ... | ... | ... |
| 2011/1/7 10:05 | 18 | 51 | 25 | 32 | ... | ... | ... |
| 2011/1/7 10:10 | 22 | 51 | 25 | 35 | ... | ... | ... |
| 2011/1/7 10:15 | 20 | 81 | 50 | 50 | ... | ... | ... |
| .. | .. | .. | .. | .. | .. | .. | .. |

| INPUT | OUTPUT | COEFFICIENT A | COEFFICIENT B | WEIGHT W | EFFECTIVENESS |
|---|---|---|---|---|---|
| SV1.CPU | SV1.DSK | 0.3 | 3 | 0.45 | × |
| SV1.CPU | SV2.CPU | 78 | 256 | 0.65 | ○ |
| SV1.CPU | SV2.MEM | 0.5 | 8 | 0.25 | × |
| SV1.CPU | SV3.CPU | 0.4 | 13 | 0.3 | × |
| SV1.CPU | SV3.MEM | 1.0 | 0.5 | 0.1 | × |
| SV1.CPU | SV3.DSK | 0.5 | 0.2 | 0.2 | × |
| .. | .. | .. | .. | .. | .. |
| SV2.CPU | SV3.CPU | 0.2 | 0.7 | 0.95 | ○ |
| SV2.CPU | SV3.MEM | 1.1 | 1.4 | 0.7 | ○ |
| SV2.CPU | SV3.DSK | 0.8 | 1.2 | 0.3 | × |
| .. | .. | .. | .. | .. | .. |
| SV3.CPU | SV3.MEM | 0.2 | 1.0 | 0.85 | ○ |
| SV3.CPU | SV3.DSK | 1.0 | 0.5 | 0.1 | × |
| SV3.MEM | SV3.DSK | 1.5 | 0.3 | 0.25 | × |

| TIME | SV1. CPU | SV1. DSK | SV2. CPU | SV2. MEM | SV3. CPU | SV3. MEM | SV3. DSK | SV4. CPU | SV4. MEM | SV4. DSK |
|---|---|---|---|---|---|---|---|---|---|---|
| 2011/1/1 10:00 | 30 | 150 | 90 | 71 | ... | ... | ... | ... | ... | ... |
| 2011/1/1 10:05 | 35 | 90 | 45 | 72 | ... | ... | ... | ... | ... | ... |
| 2011/1/1 10:10 | 40 | 92 | 50 | 74 | ... | ... | ... | ... | ... | ... |
| 2011/1/1 10:15 | 18 | 155 | 90 | 101 | ... | ... | ... | ... | ... | ... |
| .. | .. | .. | .. | .. | .. | .. | .. | .. | .. | .. |

| INPUT | OUTPUT | COEFFICIENT A | COEFFICIENT B | WEIGHT W | EFFECTIVENESS |
|---|---|---|---|---|---|
| SV1.CPU | SV1.DSK | 0.3 | 3 | 0.45 | × |
| SV1.CPU | SV2.CPU | 78 | 256 | 0.65 | ○ |
| SV1.CPU | SV2.MEM | 0.5 | 8 | 0.25 | × |
| SV1.CPU | SV3.CPU | 0.4 | 13 | 0.3 | × |
| SV1.CPU | SV3.MEM | 1.0 | 0.5 | 0.1 | × |
| SV1.CPU | SV3.DSK | 0.5 | 0.2 | 0.2 | × |
| SV1.CPU | SV4.CPU | 1.4 | 0.2 | 0.2 | × |
| SV1.CPU | SV4.MEM | 0.8 | 0.7 | 0.3 | ○ |
| SV1.CPU | SV4.DSK | 1.2 | 1.1 | 0.4 | × |
| ... | ... | ... | ... | ... | ... |
| SV2.CPU | SV3.CPU | 0.2 | 0.7 | 0.95 | ○ |
| SV2.CPU | SV3.MEM | 1.1 | 1.4 | 0.7 | ○ |
| SV2.CPU | SV3.DSK | 0.8 | 1.2 | 0.3 | × |
| SV2.CPU | SV4.CPU | 0.4 | 2.5 | 0.55 | ○ |
| SV2.CPU | SV4.MEM | 3.0 | 1.1 | 0.6 | ○ |
| SV2.CPU | SV4.DSK | 2.5 | 0.8 | 0.4 | × |
| ... | ... | ... | ... | ... | ... |
| SV3.CPU | SV3.MEM | 0.2 | 1.0 | 0.85 | ○ |
| SV3.CPU | SV3.DSK | 1.0 | 0.5 | 0.1 | × |
| SV3.MEM | SV3.DSK | 1.5 | 0.3 | 0.25 | × |
| ... | ... | ... | ... | ... | ... |
| SV4.CPU | SV4.MEM | 0.2 | 1.1 | 0.8 | ○ |
| SV4.CPU | SV4.DSK | 1.0 | 0.5 | 0.1 | × |
| SV4.MEM | SV4.DSK | 1.5 | 0.3 | 0.25 | × |

1222, 1221

OPERATIONS MANAGEMENT APPARATUS, OPERATIONS MANAGEMENT METHOD AND PROGRAM

TECHNICAL FIELD

The present invention relates to an operations management apparatus, an operations management method and a program thereof, and in particular, relates to an operations management apparatus, an operations management method and a program thereof which monitor a correlation between types of system performance values (metrics).

BACKGROUND ART

An example of an operations management system, which detects a fault of a system through generating a system model from time series information on system performance and using the generated system model, is disclosed in a patent literature 1.

According to the operations management system which is disclosed in the patent literature 1, based on measured values of various types of performance values (a plurality of metrics) on the system, a correlation regarding each pair of monitored metrics is detected, and a correlation model is generated. Then, the operations management system judges periodically, by use of the generated correlation model, whether correlation destruction is caused in the measured values of inputted metrics, and detects a fault of the system and a cause of the fault.

Moreover, patents literatures 2 and 3 disclose an operations management system which estimates a value of a metric by use of a correlation model generated as described in the patent literature 1, and estimates a bottleneck of a system.

CITATION LIST

Patent Literature

[Patent Literature 1] Japanese Patent Application Laid-Open No. 2009-199533
[Patent Literature 2] Japanese Patent Application Laid-Open No. 2009-199534
[Patent Literature 3] Japanese Patent Application Laid-Open No. 2010-237910

SUMMARY OF INVENTION

Technical Problem

According to the operations management system which is described in the patent literatures 1 to 3, it is judged whether there is the correlation regarding every pair of metrics in a plurality of the monitored metrics, and the correlation model is generated. For this reason, the operations management systems which are described in the patent literatures 1 to 3 have a problem that it takes a long time to re-generate the correlation model in the case that a monitored metric is added due to a change in a system configuration or a monitoring policy.

An object of the present invention is to solve the problem through providing an operations management apparatus, an operations management method and a program thereof which can update a correlation model quickly in the case that monitored metrics are changed.

Solution to Problem

An operations management apparatus according to an exemplary aspect of the invention includes correlation model storing means for storing a first correlation model including a correlation detected for a pair of metrics in first plural metrics, and correlation model updating means for, in the case that a metric is added, judging existence of a correlation for each of pairs of metrics obtained by excluding the pair of metrics in first plural metrics from pairs of metrics in second plural metrics including the added metric and the first plural metrics, and generating a second correlation model by adding the detected correlation to the first correlation model.

An operations management method according to an exemplary aspect of the invention includes storing a first correlation model including a correlation detected for a pair of metrics in first plural metrics, in the case that a metric is added, judging existence of a correlation for each of pairs of metrics obtained by excluding the pair of metrics in first plural metrics from pairs of metrics in second plural metrics including the added metric and the first plural metrics, and generating a second correlation model by adding the detected correlation to the first correlation model.

A computer readable storage medium according to an exemplary aspect of the invention, records thereon a program, causing a computer to perform a method including storing a first correlation model including a correlation detected for a pair of metrics in first plural metrics in the case that a metric is added, judging existence of a correlation for each of pairs of metrics obtained by excluding the pair of metrics in first plural metrics from pairs of metrics in second plural metrics including the added metric and the first plural metrics, and generating a second correlation model by adding the detected correlation to the first correlation model.

Advantageous Effect of Invention

An advantageous effect of the present invention is that it is possible to update a correlation model quickly in the case that monitored metrics are changed.

BRIEF DESCRIPTION OF DRAWINGS

FIG. 5 A diagram showing an example of sequential performance information 121 according to the first exemplary embodiment of the present invention.
FIG. 6 A diagram showing an example of correlation model information 122 according to the first exemplary embodiment of the present invention.

FIG. 11 A diagram showing another example of the sequential performance information 121 according to the first exemplary embodiment of the present invention.

FIG. 12 A diagram showing another example of the correlation model information 122 according to the first embodiment of the present invention.

DESCRIPTION OF EMBODIMENTS

First Exemplary Embodiment

Next, a first exemplary embodiment of the present invention will be described.

Figure 2:
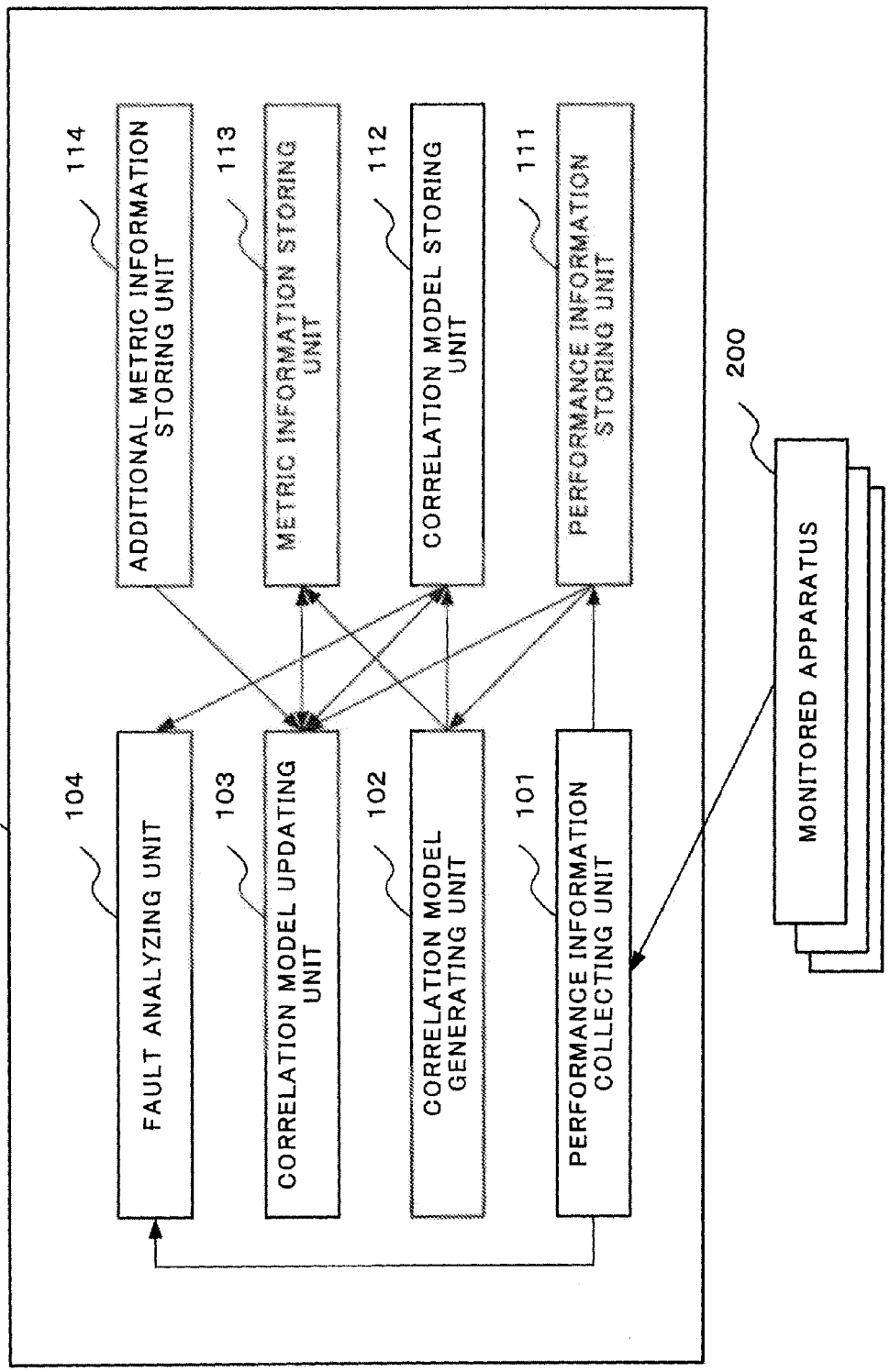
FIG. 2 A block diagram showing a configuration of an operations management system which uses an operations management apparatus 100 according to the first exemplary embodiment of the present invention.

First, a configuration according to the first exemplary embodiment of the present invention will be described. FIG. 2 is a block diagram showing a configuration of an operations management system which uses an operations management apparatus 100 according to the first exemplary embodiment of the present invention.

With reference to FIG. 2, the operations management system according to the first exemplary embodiment of the present invention includes the operations management apparatus 100 and a plurality of monitored apparatuses 200.

The operations management apparatus 100 generates a correlation model on the basis of performance information collected from the monitored apparatuses 200, and carries out a fault analysis on the monitored apparatuses 200 by use of the generated correlation model.

The monitored apparatus 200 is a component of a system which provides a user with a service. For example, a Web server, an application server (AP server), a database server (DB server) and the like are exemplified as the monitored apparatus 200.

Figure 3:
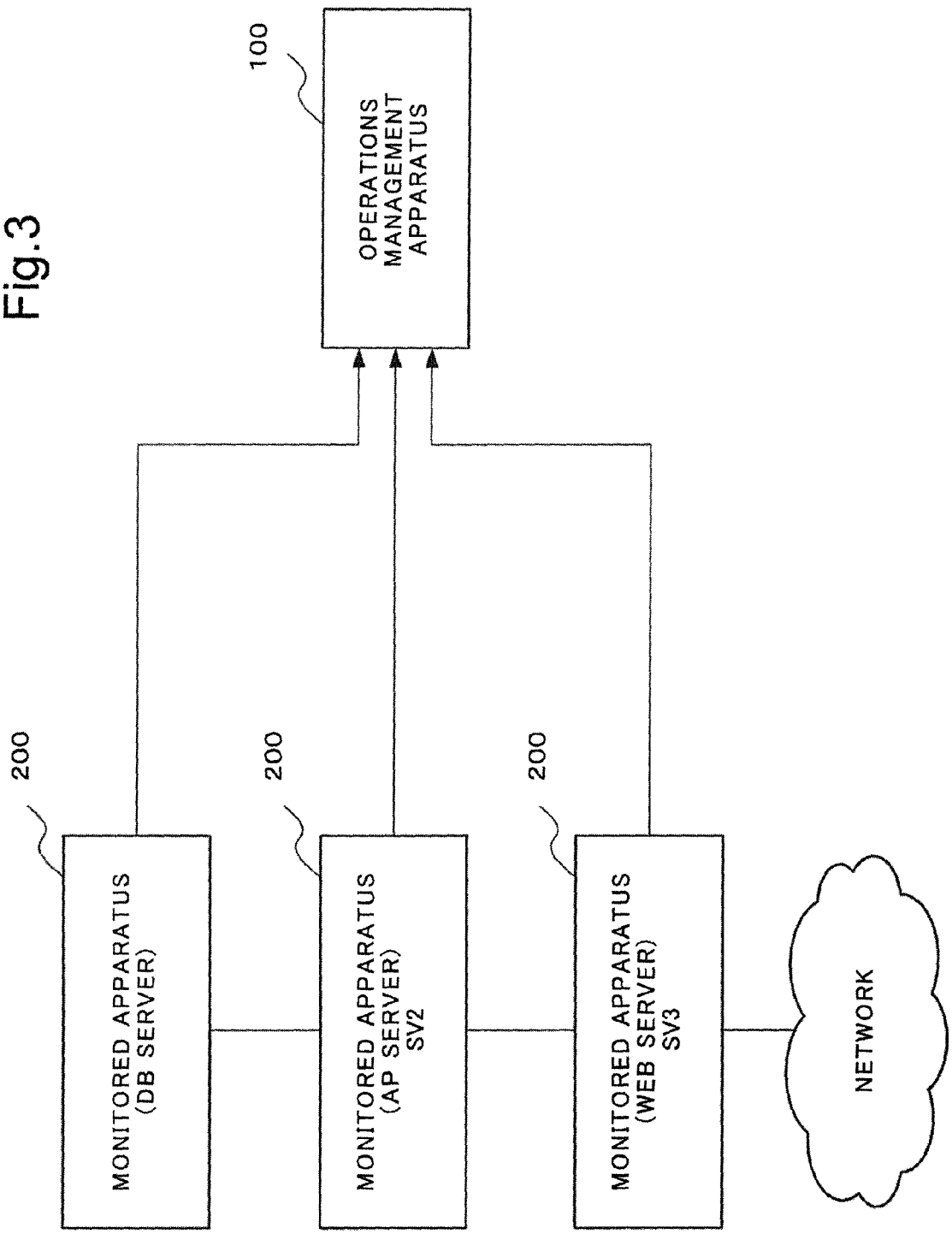
FIG. 3 A diagram showing an example of connection relations of monitored apparatuses 200 according to the first exemplary embodiment of the present invention.
Figure 10:
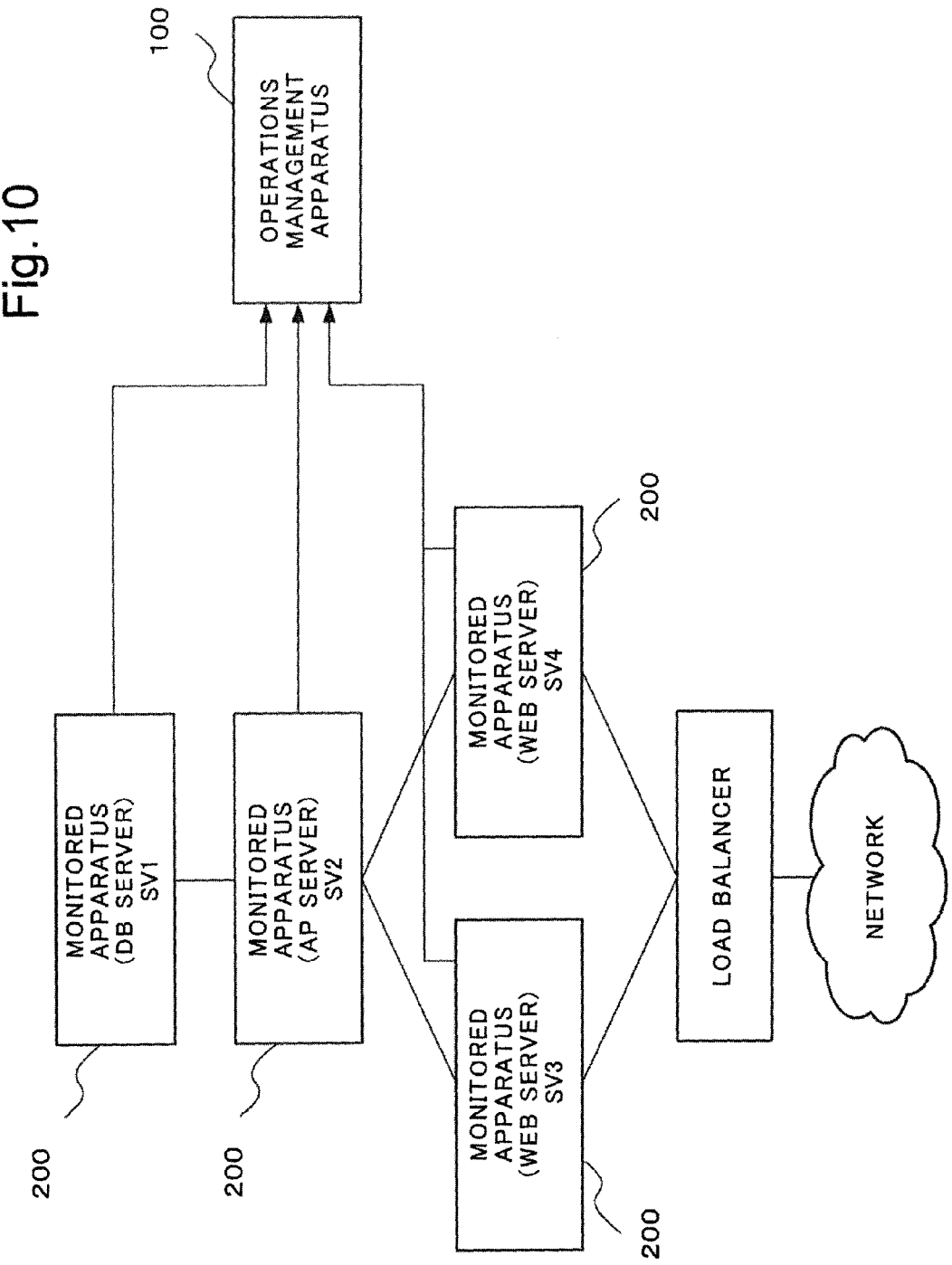
FIG. 10 A diagram showing another example of connection relations of the monitored apparatuses 200 according to the first exemplary embodiment of the present invention.

Each of FIG. 3 and FIG. 10 is a diagram showing an example of connection relations of the monitored apparatuses 200 according to the first exemplary embodiment of the present invention. According to the example shown in FIG. 3, a hierarchical system is composed of the monitored apparatuses 200, that is, a Web server, an AP server and a database server whose apparatus identifier are SV1, SV2 and SV3 respectively.

Each of the monitored apparatuses 200 measures performance values of plural items at a periodical interval and sends the measured data (measured value) to the operations management apparatus 100. Here, for example, a CPU (Central Processing Unit) usage rate (hereinafter, denoted as CPU), a memory consumption (hereinafter, denoted as MEM), a disk consumption (hereinafter, denoted as DSK) or the like is measured as the item of the performance value.

Here, a set of the monitored apparatus 200 and the item of the performance value is defined as a type of the performance value (metric), and a set of plural metric values measured at the same time is defined as performance information.

The operations management apparatus 100 includes a performance information collecting unit 101, a correlation model generating unit 102, a correlation model updating unit 103, a fault analyzing unit 104, a performance information storing unit 111, a correlation model storing unit 112, a metric information storing unit 113 and an additional metric information storing unit 114.

The performance information collecting unit 101 collects performance information from the monitored apparatuses 200 and makes the performance information storing unit 111 store a sequential change of the performance information as sequential performance information 121.

Each of FIG. 5 and FIG. 11 is a diagram showing an example of the sequential performance information 121 according to the first exemplary embodiment of the present invention. According to the example in FIG. 5, the sequential performance information 121 includes the CPU usage rate of the monitored apparatus 200 whose apparatus identifier is SV1 (SV1.CPU), the disk consumption of the monitored apparatus 200 whose apparatus identifier is SV1 (SV1.DSK), the CPU usage rate of the monitored apparatus 200 whose apparatus identifier is SV2 (SV2.CPU), the memory consumption of the monitored apparatus 200 whose apparatus identifier is SV2 (SV2.MEM), the CPU usage rate of the monitored apparatus 200 whose apparatus identifier is SV3 (SV3.CPU), the memory consumption of the monitored apparatus 200 whose apparatus identifier is SV3 (SV3.MEM) and the disk consumption of the monitored apparatus 200 whose apparatus identifier is SV3 (SV3.DSK), as a metric.

The correlation model generating unit 102 generates a correlation model related to a plurality of monitored metrics on the basis of the sequential performance information 121. Here, regarding every pair of metrics in a plurality of monitored metrics, the correlation model generating unit 102 determines a coefficient of a predetermined approximate formula (correlation function or conversion function), which approximates a relation between two metrics included in the pair (determine the correlation function), on the basis of the sequential performance information 121 which is collected for a predetermined period of time. The coefficient of the correlation function is determined by a system identifying process for sequences of measured values of the two metrics as described in the patent literatures 1 and 2. The correlation model generating unit 102 calculates a weight of the correlation function on the basis of a conversion error between the measured values by the correlation function, as described in the patent literatures 1 and 2. Here, the weight becomes, for example, smaller as an average value of the conversion error becomes larger. Then, the correlation model generating unit 102 judges that the correlation between the two metrics related to the correlation function is effective (the correlation between the two metrics exists), in the case that the weight is equal to or greater than a predetermined value. Here, a set of the effective correlations of the monitored metrics is defined as the correlation model.

Note that, while the correlation model generating unit 102 judges existence of the correlation on the basis of the conversion error by the correlation function, it may be preferable to judge with another method. For example, the correlation model generating unit 102 may judge on the basis of a variance between the two metrics or the like.

The correlation model storing unit 112 stores correlation model information 122 which indicates the correlation model generated by the correlation model generating unit 102.

Each of FIG. 6 and FIG. 12 is a diagram showing an example of the correlation model information 122 according to the first exemplary embodiment of the present invention. The correlation model information 122 includes identifiers of an input metric and an output metric of the correlation function, the coefficient of the correlation function, the weight of the correlation function and correlation judging information (effectiveness). The correlation judging information indicates that the correlation is effective (o) or ineffective (x). The example in FIG. 6 shows a case that the correlation function is assumed to be expressed in an approximate formula of y=Ax+B, and coefficients A and B are determined for each pair of the metrics. Moreover, according to FIG. 6, in the case that the weight is equal to or greater than 0.5, it is judged that the correlation between the metrics is effective.

In the case that a monitored metric is added due to a change in the system configuration or the like, the correlation model updating unit 103 updates the correlation model.

As mentioned above, a correlation model is generated through detecting existence of a correlation between two metrics out of a plurality of monitored metrics, that is, through detecting existence of a common part between an increase or decrease pattern of one metric and an increase or decrease pattern of the other metric out of two metrics. In the first exemplary embodiment of the present invention, it is assumed that the increase or decrease pattern of the metric depends mainly on logic of an application. In this case, it is conceivable that the increase or decrease pattern of the metric value is not changed as far as the logic of the application is not changed. Therefore, in the case that the correlation between two metrics does not exist, and a monitored metric is added due to the change in the system configuration which does not make the logic of the application changed, it is conceivable that the correlation between two metrics does not exist continuously.

In the first exemplary embodiment of the present invention, in the case that a correlation model (first correlation model) including correlations each detected for each pair of metrics in a plurality of monitored metrics (first plural metrics) has been stored in the correlation model storing unit 112 and then a monitored metric is added, the correlation model updating unit 103 does not detect a correlation for a pair of metrics (already-judged pair) in the metrics (first plural metrics) for which existence of a correlation has been judged already, among a plurality of the monitored metrics (second plural metrics) including the added metric. Then, the correlation model updating unit 103 determines the coefficient of the correlation function and detects existence of a correlation, similarly to the correlation model generating model 102, for every pair of metrics except the already-judged pair of metrics. That is, the correlation model updating unit 103 detects existence of the a correlation for every pair of metrics in the added metrics and for every pair of the added metric and the metric except the added metric, out of a plurality of monitored metrics. Then, the correlation model updating unit 103 updates the correlation model (generates a second correlation model) through adding the detected correlation to the correlation model.

The metric information storing unit 113 stores metric information 123 indicating the metric for which existence of a correlation has been judged in the correlation model generating process and the correlation model updating process.

Figure 9:
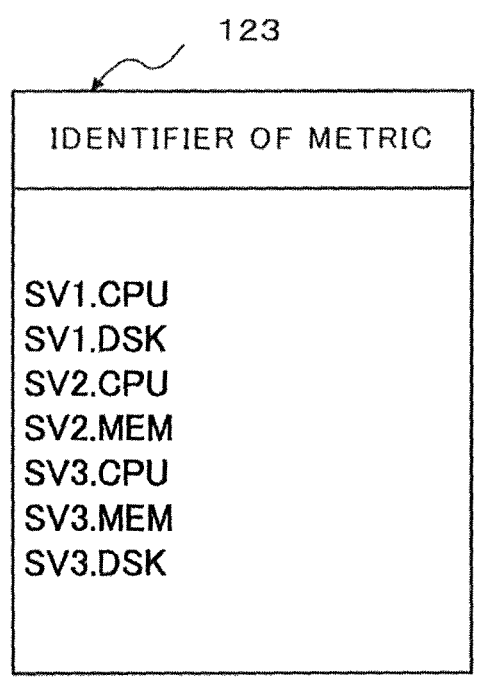
FIG. 9 A diagram showing an example of metric information 123 according to the first exemplary embodiment of the present invention.
Figure 17:
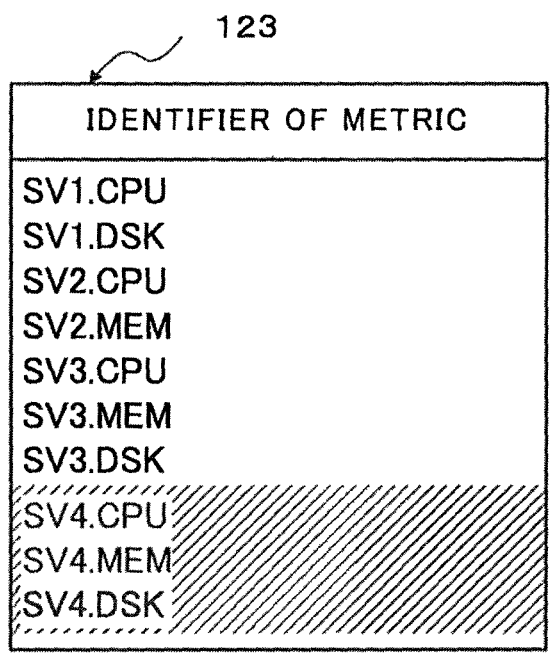
FIG. 17 A diagram showing another example of the metric information 123 according to the first exemplary embodiment of the present invention.

Each of FIG. 9 and FIG. 17 is a diagram showing an example of the metric information 123 according to the first exemplary embodiment of the present invention. The metric information 123 includes an identifier of the metric for which existence of a correlation has been judged in the correlation model generating process and the correlation model updating process.

The additional metric information storing unit 114 stores additional metric information 124 indicating a metric which is added as a metric to be monitored.

Figure 16:
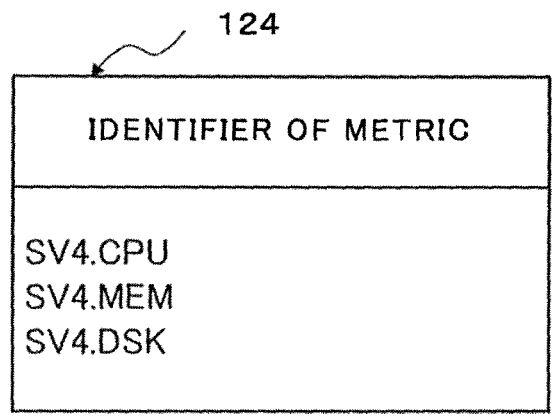
FIG. 16 A diagram showing an example of additional metric information 124 according to the first exemplary embodiment of the present invention.

FIG. 16 is a diagram showing an example of the additional metric information 124 according to the first exemplary embodiment of the present invention. The identifier of the metric which is added as the monitored object is set in the additional metric information 124 by a manager or the like.

The fault analyzing unit 104 detects a system fault and specifies a cause of the system fault through detecting correlation destruction of a correlation, which is included in a correlation model, by use of performance information inputted newly and the correlation model stored in the correlation model storing unit 112, as described in the patent literature 1.

Here, it may be preferable that the operations management apparatus 100 is a computer which includes CPU and a storage medium storing a program, and works with control based on the program. Moreover, it may be preferable that the performance information storing unit 111, the correlation model storing unit 112, the metric information storing unit 113 and the additional metric information storing unit 114 are separated each other or are included in one storage medium.

Next, an operation carried out by the operations management apparatus 100 according to the first exemplary embodiment of the present invention will be described. Here, the operation by the operations management apparatus 100 will be described through exemplifying a case that the system configuration, which includes one DB server, one AP server and one Web server as shown in FIG. 3, is changed so that the system may include a redundant configuration, which is composed of two Web servers, through adding another Web server. In this case, there is no change in the logic of the application of each server. Accordingly, even if a metric, which is related to the added Web server, is added as a metric to be monitored, it is conceivable that two metrics, whose correlation does not exist in the correlation model before the change of the system configuration, have no correlation each other also after the change of the system configuration.

Figure 4:
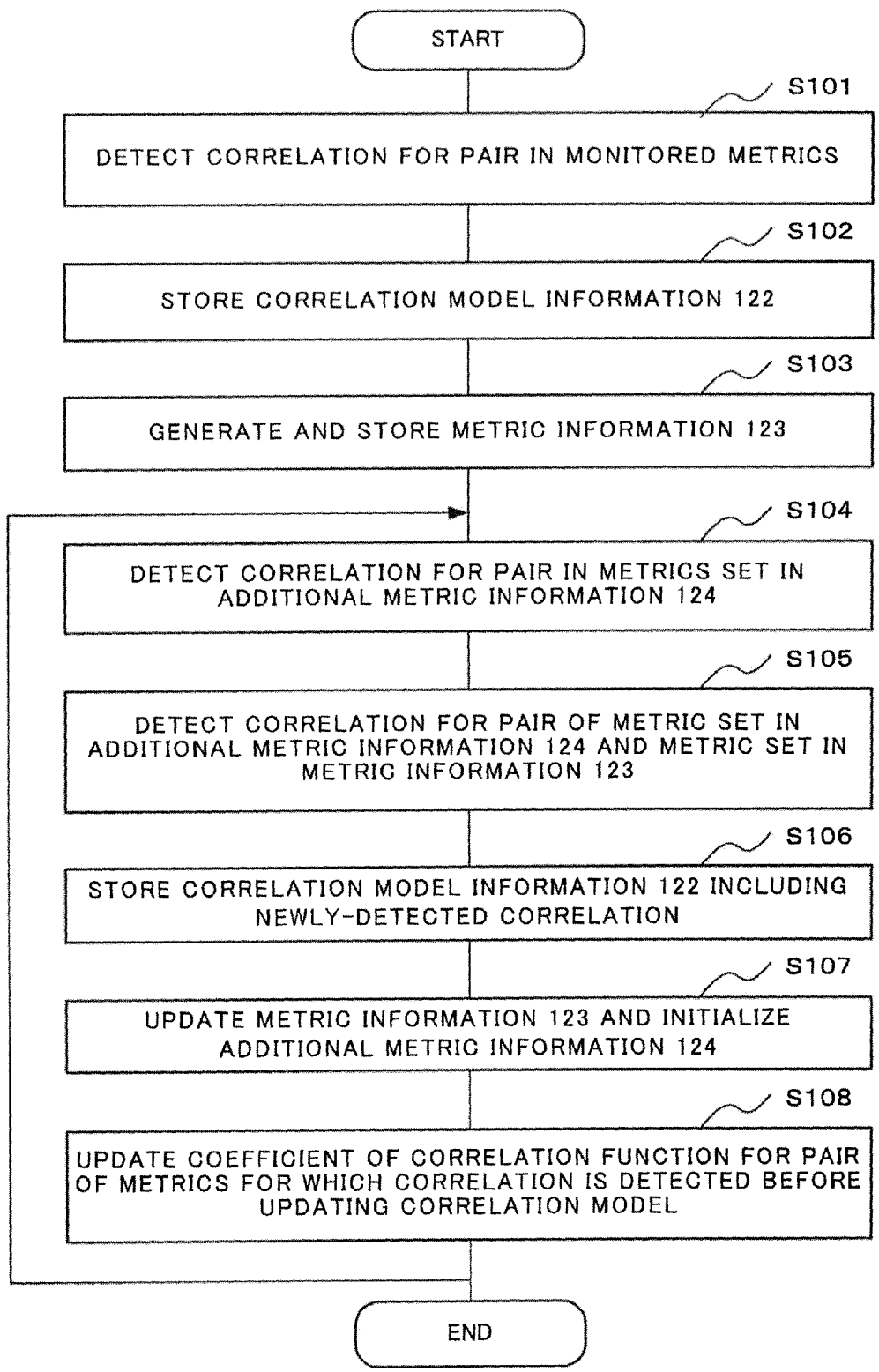
FIG. 4 A flowchart showing a process carried out by the operations management apparatus 100 according to the first exemplary embodiment of the present invention.

FIG. 4 is a flowchart showing a process carried out by the operations management apparatus 100 according to the first exemplary embodiment of the present invention.

First, the correlation model generating unit 102 of the operations management apparatus 100 detects existence of a correlation for each pair of metrics in a plurality of monitored metrics, on the basis of the sequential performance information 121 stored in the performance information storing unit 111 (Step S101), and makes the correlation model storing unit 112 store a correlation model, which includes the detected correlation relation, as the correlation model information 122 (Step S102). Here, the monitored metrics and a period of time on which the sequential performance information 121 used for generating the correlation model is collected is designated by the manager or the like.

For example, the correlation model generating unit 102 detects existence of a correlation for the monitored metrics (SV1.CPU, SV1.DSK, SV2.CPU, SV2.MEM, SV3.CPU, SV3.MEM and SV3.DSK), on the basis of the sequential performance information 121 shown in FIG. 5 which is collected by the performance information collecting unit 101 from the system shown in FIG. 3.

Figure 7:
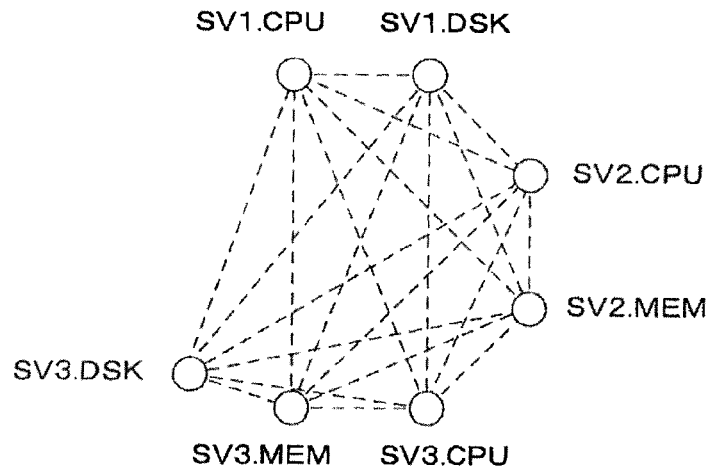
FIG. 7 A diagram showing an example of pairs of metrics for which existence of a correlation is judged in a correlation model generating process according to the first exemplary embodiment of the present invention.

FIG. 7 is a diagram showing an example of the pairs of metrics for which existence of a correlation is judged in the correlation model generating process according to the first exemplary embodiment of the present invention. In FIG. 7, each node indicates a metric, and a dotted line between the nodes indicates a pair of metrics for which a correlation is judged. As shown in FIG. 7, the correlation model generating unit 102 determines the coefficient of the correlation function, calculates the weight, and judges existence of a correlation, for every pair of metrics in the monitored metrics. As a result, the correlation between SV1.CPU and SV2.CPU, the correlation between SV2.CPU and SV3.CPU, the correlation between SV2.CPU and SV3.MEM, and the correlation between SV3.CPU and SV3.MEM are detected, as shown in FIG. 6.

Figure 8:
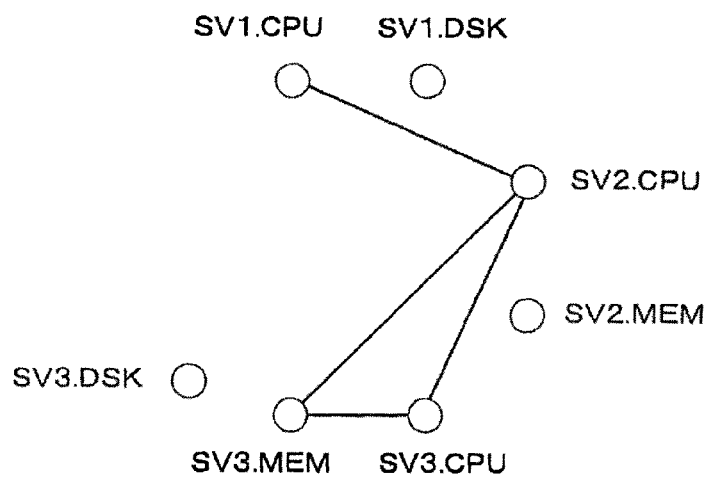
FIG. 8 A correlation graph showing an example of correlations which are detected by a correlation model generating unit 102 according to the first exemplary embodiment of the present invention.

FIG. 8 is a correlation graph showing an example of the correlations which are detected by the correlation model generating unit 102 according to the first exemplary embodiment of the present invention. In FIG. 8, a solid line between nodes indicates an effective correlation.

Then, the correlation model generating unit 102 makes the correlation model storing unit 112 store the correlation model information 122 shown in FIG. 6 including the detected correlation.

Next, the correlation model generating unit 102 generates the metric information 123 including the metric (monitored metric) for which existence of a correlation has been judged in the correlation model generating process (Step S101), and makes the metric information storing unit 113 store the generated metric information 123 (Step S103).

For example, the correlation model generating unit 102 generates the metric information 123 shown in FIG. 9.

Next, when a metric, which is added as a metric to be monitored due to the change in the system configuration or the like, is set in the additional metric information 124, the correlation model updating unit 103 detects existence of a correlation for each pair in the metrics set in the additional metric information 124, on the basis of the sequential performance information 121 which is stored in the performance information storing unit 111 (Step S104). Here, a period of time on which the sequential performance information 121 used for updating the correlation model is collected is designated by the manager or the like.

For example, in the case that the system configuration is changed as shown in FIG. 10, the metric is set in the additional metric information 124 as shown in FIG. 16. The correlation model updating unit 103 detects existence of the correlation for the metrics (SV4.CPU, SV4.MEM and SV4.DSK), which are set in the additional metric information 124 shown in FIG. 16, on the basis of the sequential performance information 121 shown in FIG. 11 which is collected from the system shown in FIG. 10 by the performance information collecting unit 101.

Figure 13:
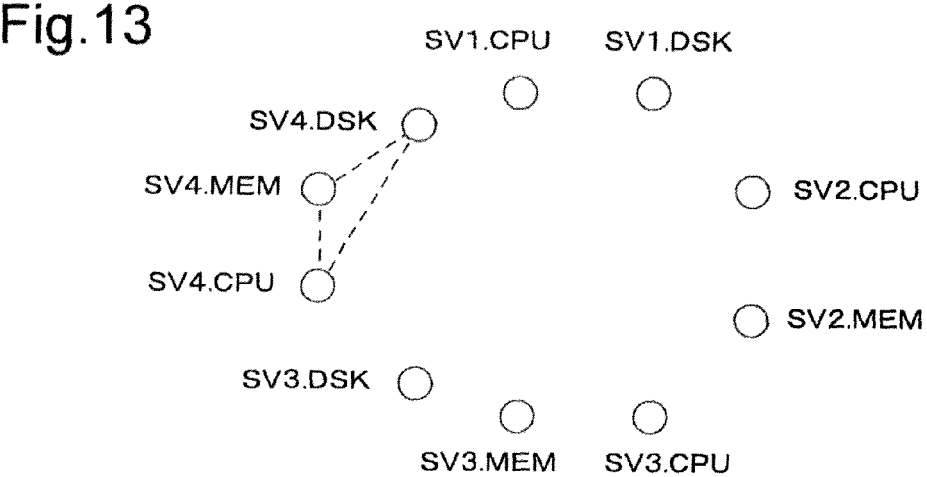
FIG. 13 A diagram showing an example of pairs of metrics for which existence of a correlation is judged in a correlation model updating process according to the first exemplary embodiment of the present invention.

FIG. 13 is a diagram showing an example of pairs of metrics for which existence of a correlation is judged in the correlation updating process according to the first exemplary embodiment of the present invention. As shown in FIG. 13, the correlation model updating unit 103 determines the coefficient of the correlation function, calculates the weight, and judges existence of a correlation, for every pair of metrics in the metrics set in the additional metric information 124 shown in FIG. 16. As a result, for example, the correlation between SV4.CPU and SV4.MEM is detected as indicated by 1221 in FIG. 12.

Furthermore, on the basis of the sequential performance information 121 stored in the performance information storing unit 111, the correlation model updating unit 103 detects existence of a correlation between the metric set in the additional metric information 124 and the metric set in the metric information 123, out of the monitored metrics (Step S105).

Figure 14:
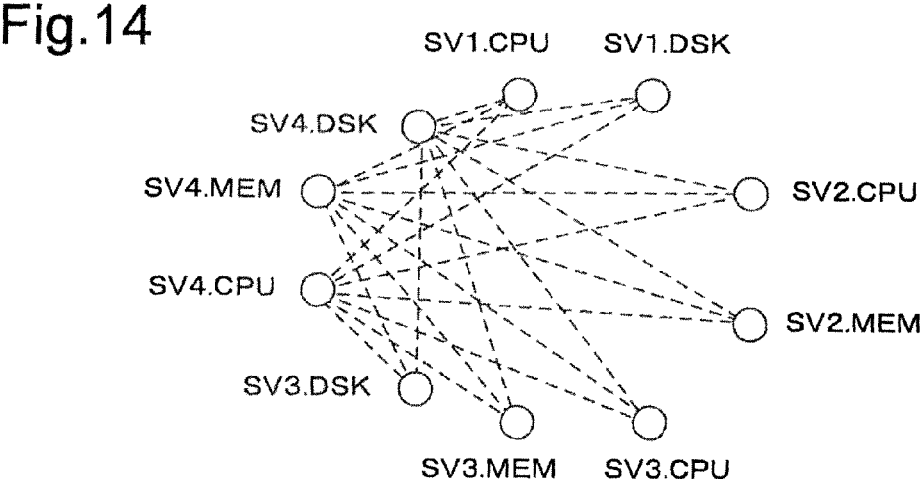
FIG. 14 A diagram showing another example of pairs of metrics for which existence of a correlation is judged in the correlation model updating process according to the first exemplary embodiment of the present invention.

FIG. 14 is a diagram showing another example of pair of metrics for which existence of a correlation is judged in the correlation model updating process according to the first exemplary embodiment of the present invention. As shown in FIG. 14, the correlation model updating unit 103 determines the coefficient of the correlation function, calculates the weight, and judges existence of a correlation, for every pair of the metric set in the additional metric information 124 shown in FIG. 16 and the metric set in the metric information 123 shown in FIG. 9. As a result, for example, the correlation between SV2.CPU and SV4.CPU, and the correlation between SV2.CPU and SV4.MEM are detected as indicated by 1222 in FIG. 12.

As mentioned above, by carrying out Steps S104 and S105, the correlation which is detected newly is added to the correlation model (correlations of the correlation model is updated).

Figure 15:
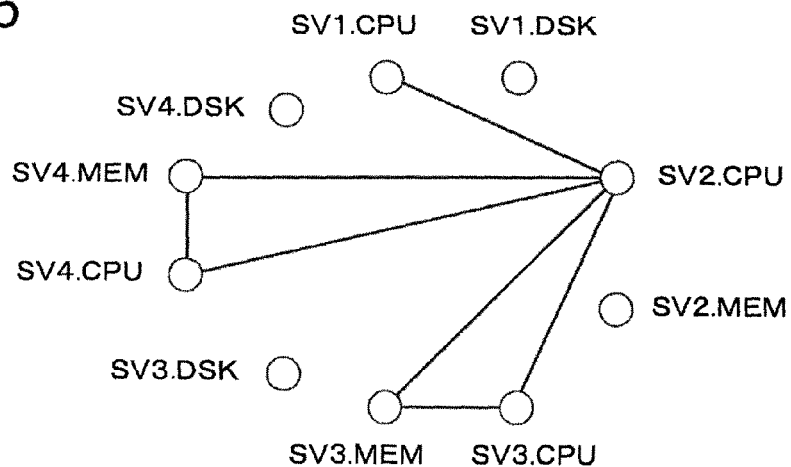
FIG. 15 A correlation graph showing an example of correlations which are updated by a correlation model updating unit 103 according to the first exemplary embodiment of the present invention.

FIG. 15 is a correlation graph showing an example of correlations which are updated by the correlation model updating unit 103 according to the first exemplary embodiment of the present invention. With reference to the correlation graph in FIG. 15, the correlations, which are detected newly by the correlation model updating unit 103, are added to the correlation graph in FIG. 8.

Next, the correlation model updating unit 103 makes the correlation model storing unit 112 store the correlation model including the newly-detected correlation, as the correlation model information 122 (Step S106).

For example, the correlation model updating unit 103 makes the correlation model storing unit 112 store the correlation model information 122 shown in FIG. 12.

Next, the correlation model updating unit 103 adds the added metric to the metric information 123 (updates the metric information 123), makes the metric information storing unit 113 store the metric information 123, and initializes the additional metric information 124 (Step S107).

For example, the correlation model updating unit 103 updates the metric information 123 as shown in FIG. 17.

Note that, while it is unnecessary to detect existence of a correlation for each pair of the metrics for which existence of a correlation has been judged before the correlation model is updated, it may be preferable that the correlation model updating unit 103 updates the coefficient of the correlation function (updates the correlation function) for each pair of metrics for which the correlation has been detected out of the already-judged pairs (Step S108). Moreover, it may be preferable that the correlation model updating unit 103 judges existence of the correlation again on the basis of the updated correlation function.

For example, the correlation model updating unit 103 may update the coefficient of the correlation function related to each of the correlations between SV1.CPU and SV2.CPU, SV2.CPU and SV3.CPU, SV2.CPU and SV3.MEM, and SV3.CPU and SV3.MEM.

Afterward, Steps S104 to S108 are repeated every time when a monitored metric is added newly.

With that, the operation according to the first exemplary embodiment of the present invention is completed.

Next, a characteristic configuration of the first exemplary embodiment of the present invention will be described. FIG.

1 is a block diagram showing a characteristic configuration according to the first exemplary embodiment of the present invention.

Figure 1:
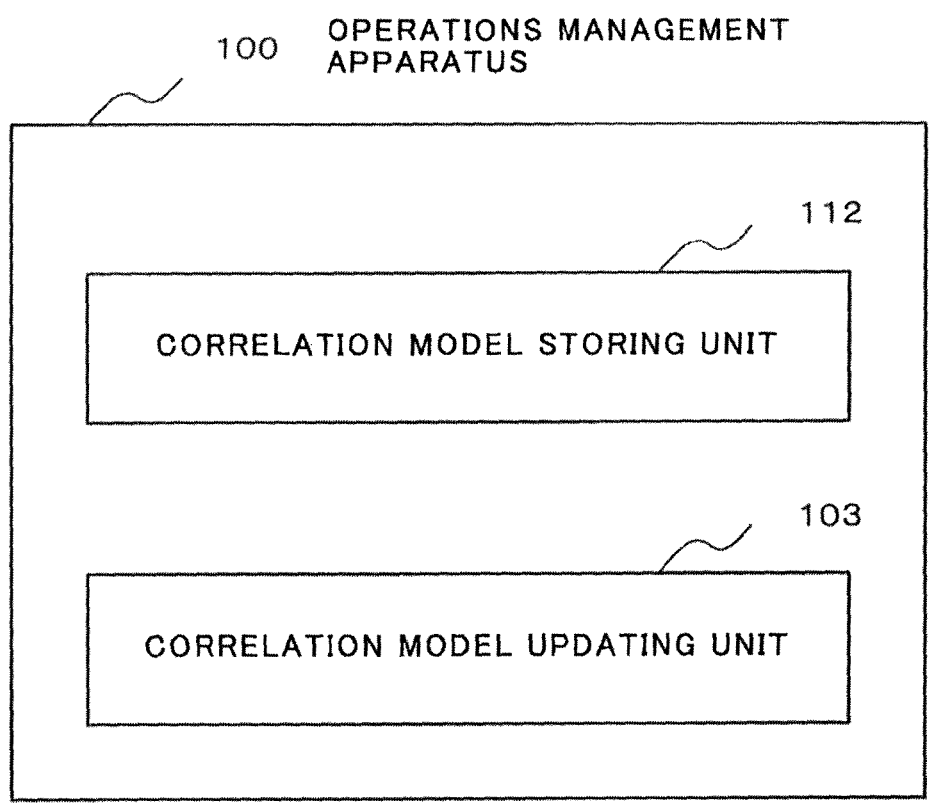
FIG. 1 A block diagram showing a characteristic configuration according to a first exemplary embodiment of the present invention.

Referring to FIG. 1, the operations management apparatus 100 includes a correlation model storing unit 112 and a correlation model updating unit 103.

Here, the correlation model storing unit 112 stores a first correlation model including a correlation detected for a pair of metrics in first plural metrics.

The correlation model updating unit 103, in the case that a metric is added, judges existence of a correlation for each of pairs of metrics obtained by excluding the pair of metrics in first plural metrics from pairs of metrics in second plural metrics including the added metric and the first plural metrics, and generates a second correlation model by adding the detected correlation to the first correlation model.

According to the first exemplary embodiment of the present invention, it is possible to update a correlation model quickly in the case that monitored metrics are changed. The reason is in the following. That is, in the case a monitored metric is added, the correlation model updating unit 103 judges existence of a correlation for each pair of metrics except pairs of metrics for which existence of a correlation has been already judged, out of pairs of metrics in a plurality of the metrics including the added metrics, and adds the detected correlation to the correlation model stored in the correlation model storing unit 112. As a result, it is possible to update the correlation model quickly since it is unnecessary to detect existence of a correlation for a whole of pairs of the monitored metrics in the case that a monitored metric is added.

Moreover, according to the first exemplary embodiment of the present invention, in the case that monitored metrics are changed, it is possible to update a state related to the correlation which has been detected before updating the correlation model. The reason is that, in the case that a monitored metric is added, the correlation model update unit 103 updates the correlation function for each pair of metrics for which the correlation has been detected, out of pairs of metrics for which existence of a correlation has been judged before updating the correlation model.

While the invention has been particularly shown and described with reference to exemplary embodiments thereof, the invention is not limited to these embodiments. It will be understood by those of ordinary skill in the art that various changes in form and details may be made therein without departing from the spirit and scope of the present invention as defined by the claims.

For example, while the operation has been described through exemplifying the case that the server which composes the redundant configuration is added due to the change in the configuration of the monitored system, the present invention is not limited to the case. The same effect can be obtained in the case that a monitored metric is added due to a change in a managing policy with no change in the configuration of the monitored system, since the logic of the application is not changed.

Moreover, the same effect can be obtained also in the case that, when CPU or a memory resource is reinforced, a metric related to the reinforced CPU or the reinforced memory resource is added as a metric to be monitored with no change in the logic of the application in the virtual environment or the like.

Furthermore, the same effect can be obtained in the case that a parameter of the application is changed, and a metric related to the changed parameter is added with no change in the logic of the application, for example, in the case that the cache size of the database, the number of the worker threads of the AP server or the like is reinforced.

This application is based upon and claims the benefit of priority from Japanese Patent Application No. 2011-011887, filed on Jan. 24, 2011, the disclosure of which is incorporated herein in its entirety by reference.

REFERENCE SIGNS LIST

100 Operations management apparatus
101 Performance information collecting unit
102 Correlation model generating unit
103 Correlation model updating unit
104 Fault analyzing unit
111 Performance information storing unit
112 Correlation model storing unit
113 Metric information storing unit
114 Additional metric information storing unit
121 Sequential performance information.
122 Correlation model information
123 Metric information
124 Additional metric information
200 Monitored apparatus

What is claimed is:

1. An operations management apparatus comprising:
a correlation model storing unit which stores a first correlation model including one or more correlations detected for one or more pairs of metrics in first plural metrics; and
a correlation model updating unit which, in the case that one or more metrics are added, detects a correlation for each of one or more pairs of metrics obtained by excluding said one or more pairs of metrics in first plural metrics from pairs of metrics in second plural metrics including said added metrics and said first plural metrics, and generates a second correlation model by adding the detected correlation to said first correlation model.

2. The operations management apparatus according to claim 1, further comprising:
a metric information storing unit which stores metric information indicating said first plural metrics,
wherein, in the case generating said second correlation model, said correlation model updating unit detects a correlation for each pair of metrics in said added metrics and for each pair of each of said added metrics and each of metrics included in said metric information, and adds said added metrics to said metric information.

3. The operations management apparatus according to claim 2, further comprising:
a correlation model generating unit which detects a correlation for each pair of metrics in said first plural metrics, generates said first correlation model including the detected correlation, and sets said first plural metrics in said metric information.

4. The operations management apparatus according to claim 3, further comprising:
a performance information storing unit which stores measured values of each of a plurality of metrics sequentially,
wherein a correlation function for a pair of metrics in said performance information storing unit is determined on the basis of said measured values of the pair of metrics measured for a predetermined period of time, and a correlation for the pair of metrics is detected on the basis of a conversion error by the determined correlation function.

5. The operations management apparatus according to claim 2, further comprising:
a performance information storing unit which stores measured values of each of a plurality of metrics sequentially,
wherein a correlation function for a pair of metrics in said performance information storing unit is determined on the basis of said measured values of the pair of metrics measured for a predetermined period of time, and a correlation for the pair of metrics is detected on the basis of a conversion error by the determined correlation function.

6. The operations management apparatus according to claim 1, further comprising:
a performance information storing unit which stores measured values of each of a plurality of metrics sequentially,
wherein a correlation function for a pair of metrics in said performance information storing unit is determined on the basis of said measured values of the pair of metrics measured for a predetermined period of time, and a correlation for the pair of metrics is detected on the basis of a conversion error by the determined correlation function.

7. The operations management apparatus according to claim 6, wherein said correlation model updating unit updates a correlation function for each pair of metrics for which a correlation has been detected in said first correlation model.

8. The operations management apparatus according to claim 1, wherein the correction model updating unit generates the second correlation model for a whole of a system including correlations between added metrics, between existing metrics, and between each of the added metrics and each of the existing metrics, and without performing correlation detection for all pairs of metrics in the system.

9. An operations management method comprising:
storing a first correlation model including one or more correlations detected for one or more pairs of metrics in first plural metrics;
in the case that one or more metrics are added, detecting a correlation for each of one or more pairs of metrics obtained by excluding said one or more pairs of metrics in first plural metrics from pairs of metrics in second plural metrics including said added metrics and said first plural metrics; and
generating a second correlation model by adding the detected correlation to said first correlation model.

10. The operations management method according to claim 9, further comprising:
storing metric information indicating said first plural metrics,
wherein said generating a second correlation model detects a correlation for each pair of metrics in said added metrics and for each pair of each of said added metrics and each of metrics included in said metric information, and adds said added metrics to said metric information.

11. The operations management method according to claim 10, further comprising:
detecting a correlation for each pair of metrics in said first plural metrics;
generating said first correlation model including the detected correlation; and
setting said first plural metrics in said metric information.

12. The operations management method according to claim 11, further comprising:
storing measured values of each of a plurality of metrics sequentially, wherein a correlation function for a pair of metrics is determined on the basis of said measured values of the pair of metrics measured for a predetermined period of time, and a correlation for the pair of metrics is detected on the basis of a conversion error by the determined correlation function.

13. The operations management method according to claim 10, further comprising:
storing measured values of each of a plurality of metrics sequentially,
wherein a correlation function for a pair of metrics is determined on the basis of said measured values of the pair of metrics measured for a predetermined period of time, and a correlation for the pair of metrics is detected on the basis of a conversion error by the determined correlation function.

14. The operations management method according to claim 9, further comprising:
storing measured values of each of a plurality of metrics sequentially,
wherein a correlation function for a pair of metrics is determined on the basis of said measured values of the pair of metrics measured for a predetermined period of time, and a correlation for the pair of metrics is detected on the basis of a conversion error by the determined correlation function.

15. The operations management method according to claim 14, wherein said generating a second correlation model updates a correlation function for each pair of metrics for which a correlation has been detected in said first correlation model.

16. A non-transitory computer readable storage medium recording thereon a program, causing a computer to perform a method comprising:
storing a first correlation model including one or more correlations detected for one or more pairs of metrics in first plural metrics;
in the case that one or more metrics are added, detecting a correlation for each of one or more pairs of metrics obtained by excluding said one or more pairs of metrics in first plural metrics from pairs of metrics in second plural metrics including said added metrics and said first plural metrics; and
generating a second correlation model by adding the detected correlation to said first correlation model.

17. The non-transitory computer readable storage medium according to claim 16, recording thereon said program causing said computer to perform said method further comprising:
storing metric information indicating said first plural metrics,
wherein said generating a second correlation model detects a correlation for each pair of metrics in said added metrics and for each pair of each of said added metrics and each of metrics included in said metric information, and adds said added metrics to said metric information.

18. The non-transitory computer readable storage medium according to claim 17, recording thereon said program causing said computer to perform said method further comprising:
detecting a correlation for each pair of metrics in said first plural metrics;
generating said first correlation model including the detected correlation; and
setting said first plural metrics in said metric information.

19. The non-transitory computer readable storage medium according to claim 16, recording thereon said program causing said computer to perform said method further comprising:

storing measured values of each of a plurality of metrics sequentially, wherein a correlation function for a pair of metrics is determined on the basis of said measured values of the pair of metrics measured for a predetermined period of time, and a correlation for the pair of metrics is detected on the basis of a conversion error by the determined correlation function.

20. The non-transitory computer readable storage medium according to claim 19, recording thereon said program causing said computer to perform said method, wherein said generating a second correlation model updates a correlation function for each pair of metrics for which a correlation has been detected in said first correlation model.

21. An operations management apparatus comprising:

correlation model storing means for storing a first correlation model including one or more correlations detected for one or more pairs of metrics in first plural metrics; and correlation model updating means for, in the case that one or more metrics are added, detecting a correlation for each of one or more pairs of metrics obtained by excluding said one or more pairs of metrics in first plural metrics from pairs of metrics in second plural metrics including said added metrics and said first plural metrics, and generates a second correlation model by adding the detected correlation to said first correlation model.

* * * * *